US011052985B2

(12) United States Patent
Liu et al.

(10) Patent No.: US 11,052,985 B2
(45) Date of Patent: Jul. 6, 2021

(54) METHOD FOR FLYING LARGE BALLOON

(71) Applicant: Dongguan Frontier Technology Institute, Dongguan (CN)

(72) Inventors: Ruopeng Liu, Shenzhen (CN); Lin Luan, Shenzhen (CN); Wei He, Shenzhen (CN); Wei He, Shenzhen (CN); Xiang Hu, Shenzhen (CN); Shikuan Xu, Shenzhen (CN); Fei Zhou, Shenzhen (CN)

(73) Assignee: DONGGUAN FRONTIER TECHNOLOGY INSTITUTE, Dongguan (CN)

( * ) Notice: Subject to any disclaimer, the term of this patent is extended or adjusted under 35 U.S.C. 154(b) by 469 days.

(21) Appl. No.: 16/168,782

(22) Filed: Oct. 23, 2018

(65) Prior Publication Data

US 2019/0054994 A1 Feb. 21, 2019

Related U.S. Application Data

(63) Continuation of application No. PCT/CN2017/079582, filed on Apr. 6, 2017.

(30) Foreign Application Priority Data

May 19, 2016 (CN) .......................... 201610338292.9

(51) Int. Cl.
*B64B 1/40* (2006.01)
*B64B 1/00* (2006.01)
*B64B 1/62* (2006.01)

(52) U.S. Cl.
CPC ................ *B64B 1/005* (2013.01); *B64B 1/40* (2013.01); *B64B 1/62* (2013.01)

(58) Field of Classification Search
CPC .. B64B 1/005; B64B 1/40; B64B 1/58; B64B 1/62; B64F 1/04
See application file for complete search history.

(56) References Cited

U.S. PATENT DOCUMENTS 2,708,082 A * 5/1955 Moore ...................... B64B 1/40
244/31
2,880,946 A * 4/1959 Froehlich .................. B64B 1/58
244/31

(Continued)

FOREIGN PATENT DOCUMENTS

CN 1562702 A 1/2005
CN 103863546 A 6/2014

(Continued)

*Primary Examiner* — Brian M O'Hara
*Assistant Examiner* — Michael B. Kreiner
(74) *Attorney, Agent, or Firm* — Armstrong Teasdale LLP

(57) ABSTRACT

The present disclosure relates to the aerospace application field, and provides a method for flying a large balloon. In the method, a constraint apparatus is disposed on a balloon capsule to replace a roller, and the constraint apparatus is released progressively in a release process of the balloon capsule, so that the balloon capsule is released progressively and slowly before rising above a pod. This greatly reduces the impact in a flying process, makes it easier to control a flying status of the balloon capsule, and also makes related operations of onsite staffs simpler and controllable.

16 Claims, 5 Drawing Sheets

(56) References Cited

U.S. PATENT DOCUMENTS

| | | | | | |
|---|---|---|---|---|---|
| 2,919,083 | A | * | 12/1959 | Suomi | B64B 1/58 |
| | | | | | 244/31 |
| 2,954,187 | A | * | 9/1960 | Winzen | B64B 1/40 |
| | | | | | 244/31 |
| 2,977,069 | A | * | 3/1961 | Hugh | B64B 1/40 |
| | | | | | 244/31 |
| 3,195,835 | A | * | 7/1965 | Eyre | B64B 1/62 |
| | | | | | 244/31 |
| 3,195,839 | A | * | 7/1965 | Dietsche | B64B 1/62 |
| | | | | | 244/98 |
| 3,452,949 | A | * | 7/1969 | Bassett | B64B 1/40 |
| | | | | | 244/31 |
| 3,507,462 | A | * | 4/1970 | Stefan | B64B 1/40 |
| | | | | | 244/31 |
| 3,524,609 | A | * | 8/1970 | Sparkman | B64B 1/40 |
| | | | | | 244/31 |
| 3,558,083 | A | * | 1/1971 | Conley | B64B 1/40 |
| | | | | | 244/33 |
| 3,814,353 | A | * | 6/1974 | Nelson | B64B 1/62 |
| | | | | | 244/98 |
| 9,327,819 | B2 | * | 5/2016 | Ratner | B64F 1/14 |
| 9,327,844 | B2 | * | 5/2016 | Ratner | B64B 1/40 |
| 9,745,040 | B1 | * | 8/2017 | Hall-Snyder | B64F 1/12 |

FOREIGN PATENT DOCUMENTS

| | | |
|---|---|---|
| CN | 106005350 A | 10/2016 |
| DE | 1269507 B | 5/1968 |

\* cited by examiner

METHOD FOR FLYING LARGE BALLOON

CROSS REFERENCE TO RELATED APPLICATIONS

This application is a continuation of PCT Application No. PCT/CN2017/079582 filed on Apr. 6, 2017, which claims priority to CN 201610338292.9 filed May 19, 2016, both of which are incorporated herein by reference.

TECHNICAL FIELD

The present disclosure relates to the aerospace application field, and more specifically, to a method for flying a large balloon.

BACKGROUND

Currently, a large overloaded balloon is mainly launched or flown in a dynamic launching mode. A dynamic launching system usually includes one mobile dynamic launching vehicle. The dynamic launching vehicle constrains a pod below a balloon and releases the pod at proper time. The dynamic launching vehicle moves in cooperation with the balloon to implement steady release of the pod. For the balloon, a roller apparatus is mainly used to constrain and release the balloon. Such release is performed instantly when the roller is opened. Afterwards, the balloon rises above the pod relatively fast, and the dynamic launching vehicle releases the pod. Because a constraint of the roller on the balloon is released at one time, the balloon has had a relatively high speed when arriving above the dynamic launching vehicle. In addition, because the balloon has also moved for a relatively long distance before arriving above the dynamic launching vehicle, a status of the balloon at this time is not easy to control. This not only easily causes relatively large impact, but also brings more difficult to related operations of the dynamic launching vehicle, such as cooperated movement and final constraint release.

SUMMARY

An objective of the present disclosure is to provide a method for flying a large balloon, so as to resolve prior-art problems that there is large impact when a large balloon is flown and it is difficult to control and cooperate with a dynamic launching vehicle.

To resolve the foregoing technical problems, a technical solution of the present disclosure is to provide a method for flying a large balloon, including the following steps:

S1: Connect one end of a balloon capsule to one end of a rope, fasten the other end of the rope to a pod, and dispose, on the balloon capsule, a bundling part that can be controlled remotely, where the bundling part divides the balloon capsule into a first capsule part away from the pod and a second capsule part close to the pod.

S2: Dispose a constraint apparatus above the second capsule part, where the constraint apparatus constrains the second capsule part along a length direction of the second capsule part.

S3: Inflate the first capsule part until the first capsule part flies away from the ground.

S4: When the first capsule part continuously moves towards a direction close to the pod in a horizontal direction, gradually release the constraint apparatus in a direction from one end, close to the first capsule part, of the second capsule part to the pod.

S5: After the balloon capsule fully rises, relieve a constraint of the bundling part on the balloon capsule, so that the entire balloon capsule is flown to the sky.

Specifically, in step S1, the other end of the rope is fastened to the pod after passing by the top of a crane arm of a launching vehicle, the crane arm of the launching vehicle is disposed slantwise towards a direction away from the balloon capsule, the balloon capsule, the launching vehicle, and the pod are disposed in a straight line, and the launching vehicle is located between the balloon capsule and the pod.

Specifically, the bundling part used in step S1 includes a bundling strap configured to bundle the balloon capsule, and a breaking apparatus connected to the bundling strap and configured to break the bundling strap.

Specifically, the breaking apparatus used in step S1 includes a wireless communications element and a breaking element, the wireless communications element is configured to receive a remote control instruction so that the breaking element can be controlled remotely, and the breaking element is configured to: under an indication of the remote control instruction received by the wireless communications element, break the bundling strap by means of cutting or burning.

Specifically, the breaking element is an initiating explosive device or a rope cutter.

Specifically, the constraint apparatus used in step S2 includes a plurality of constraint parts that are disposed sequentially along the length direction of the second capsule part at a spacing, and the plurality of constraint parts are configured to respectively constrain the second capsule part at places in the length direction of the second capsule part.

Specifically, the constraint parts are constraint ropes, an extension direction of each constraint rope is perpendicular to or slanting to the length direction of the second capsule part, two ends of each constraint rope are fastened to a flying place, and the second capsule part is located below the constraint ropes.

Specifically, in step S2, protection parts are disposed between the constraint ropes and the second capsule part to protect the second capsule part.

Specifically, the protection parts are protection cotton or anti-wear pads covering the constraint ropes.

Specifically, in step S2, the two ends of each constraint rope are fastened to the flying place by using a ground anchor.

Specifically, in step S4, after a constraint rope is released, a next constraint rope is released when the first capsule part rises and moves above the next constraint rope, until a last constraint rope is released.

Specifically, after step S4, the launching vehicle moves as the first capsule part rises, and when the first capsule part rises right above the pod, a constraint of the crane arm on the pod is relieved.

In the present disclosure, the constraint apparatus is used to replace a roller, and the constraint apparatus is released progressively in a release process of the balloon capsule, so that the balloon capsule is released progressively and slowly before rising above the pod. This greatly reduces impact in a flying process, makes it easier to control a flying status of the balloon capsule, and also makes related operations of onsite staffs simpler and controllable.

10-Balloon capsule; 11-First capsule part; 12-Second capsule part;
20-Flying place; 30-Rope; 40-Pod;
50-Launching vehicle; 51-Crane arm; 60-Bundling part;
70-Constraint part; 71-Ground anchor.

DESCRIPTION OF EMBODIMENTS

To make the objective, technical solution, and advantage of the present disclosure clearer, the following further describes the present disclosure in detail with reference to the accompanying drawings and an embodiment. It should be understood that the specific embodiment described herein is merely used to explain the present disclosure, but not to limit the present disclosure.

It should be noted that, when an element is referred to as being "fastened to" or "disposed on" another element, the element may be directly on the another element, or there may be an intermediate element. When an element is referred to as being "connected to" another element, the element may be directly connected to the another element, or there may be an intermediate element.

It should be further noted that orientation terms such as left, right, top, and bottom in this embodiment are merely relative concepts or determined with reference to a normal use status of a product, but should not be considered as a limitation.

Figure 1:
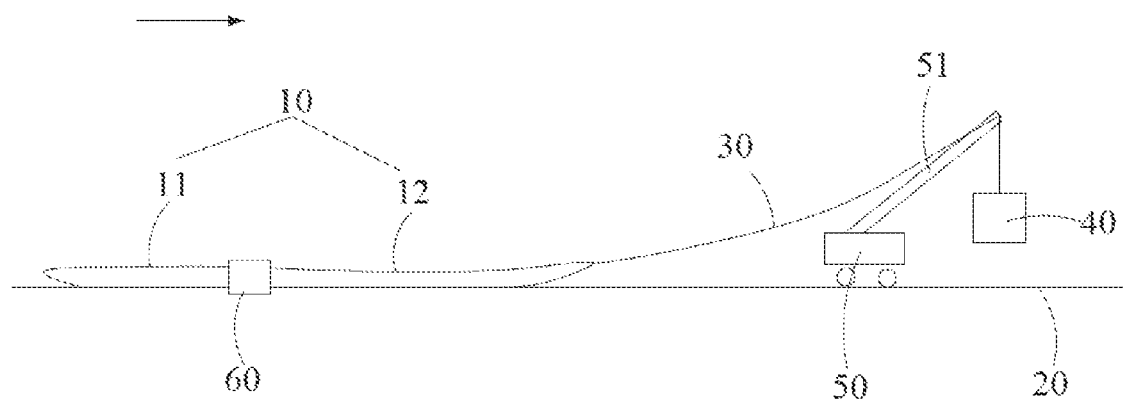
FIG. 1 is a side view of overall layout at a flying place before a balloon capsule is flown in step S1 of an embodiment of the present disclosure.
Figure 2:
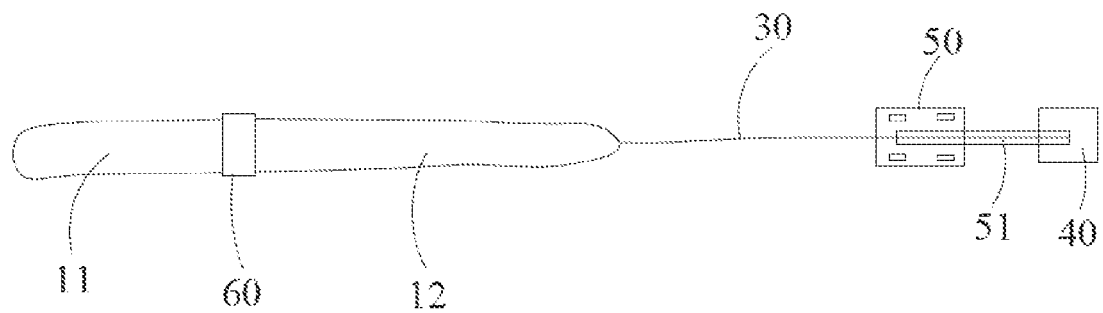
FIG. 2 is a top view of FIG. 1.

An embodiment of the present disclosure provides a method for flying a large balloon, including the following steps:

S1: Referring to FIG. 1 and FIG. 2, lay a balloon capsule 10 on a flying place 20, connect one end of the balloon capsule 10 to one end of a rope 30, fasten the other end of the rope 30 to a pod 40, and tie, to the balloon capsule 10, a bundling part 60 that can be controlled remotely, where the bundling part 60 divides the balloon capsule 10 into a first capsule part 11 away from a launching vehicle 50 and a second capsule part 12 close to the launching vehicle 50.

In this embodiment, the bundling part 60 includes a bundling strap and a breaking apparatus connected to the bundling strap, and the breaking apparatus is configured to break the bundling strap by means of cutting or burning, so that the balloon capsule 10 breaks away from the bundling strap. The breaking apparatus includes a wireless communications element and a breaking element. The wireless communications element is configured to receive a remote control instruction so that the breaking element can be controlled remotely. The breaking element is configured to: under an indication of the remote control instruction received by the wireless communications element, break the bundling strap by means of cutting or burning. In this embodiment, the breaking element may be an initiating explosive device or a rope cutter. Certainly, the bundling part 60 is not limited to the bundling strap and the breaking apparatus in this embodiment, and may alternatively be another structure, for example, a rigid bundling element that can be controlled remotely and that is switched on/off by using a motor. This embodiment constitutes no limitation.

Specifically, it can be learned from the figure that, in this step, the other end of the rope 30 is fastened to the pod 40 after passing by the top of a crane arm 51 of the launching vehicle 50. The crane arm 51 of the launching vehicle 50 is disposed slantwise towards a direction away from the balloon capsule 10, so as to implement that the pod 40 is suspended on one side of the launching vehicle 50, the balloon capsule 10, the launching vehicle 50, and the pod 40 are disposed in a straight line at the flying place 20, and the launching vehicle 50 is located between the balloon capsule 10 and the pod 40. The balloon capsule 10 gradually approaches the pod in a flying process. A movement direction of the balloon capsule 10 is consistent with a wind direction indicated by an arrow in FIG. 1. However, it should be noted that there is usually a wind speed requirement for flying such a large balloon. It is generally required that the balloon be flown when there is no wind or weak wind (it is generally required that a wind speed should be less than 3-5 m/s). If the balloon is flown when there is wind, the balloon capsule 10, the launching vehicle 50, and the pod 40 are disposed down the wind.

S2: Dispose a constraint apparatus above the second capsule part 12, where the constraint apparatus constrains the second capsule part 12 along a length direction of the second capsule part 12.

Figure 3:
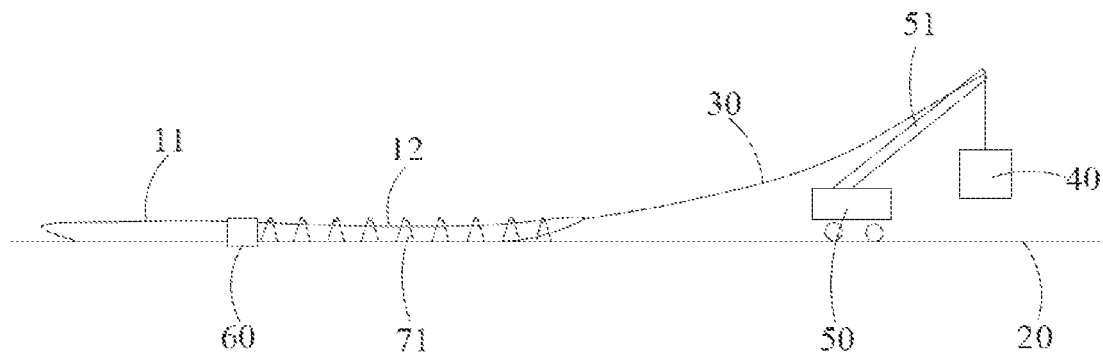
FIG. 3 is a side view after a plurality of constraint ropes are fastened to a second capsule part in step S2 of the embodiment of the present disclosure.
Figure 4:
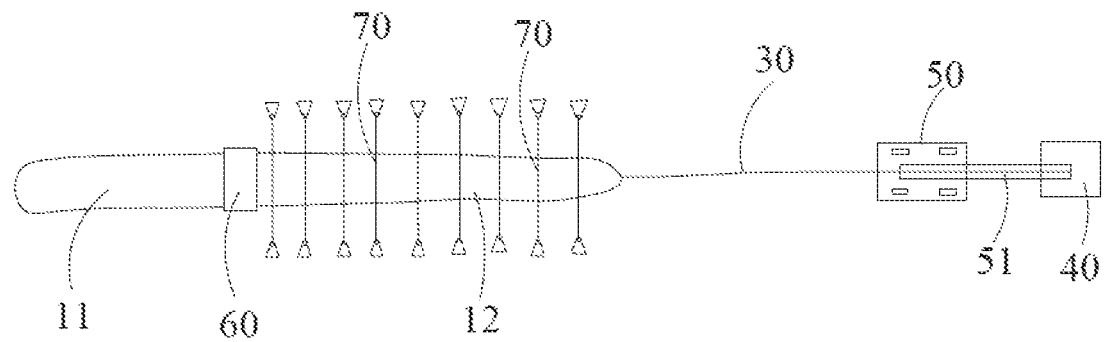
FIG. 4 is a top view of FIG. 3.

Referring to FIG. 3 and FIG. 4, specifically, in this embodiment, the constraint apparatus includes a plurality of constraint parts 70 that are disposed sequentially along the length direction of the second capsule part 12 at a spacing, and the plurality of constraint parts 70 are configured to respectively constrain the second capsule part 12 at places in the length direction of the second capsule part 12. Preferably, the constraint parts 70 are constraint ropes. An extension direction of each constraint rope is perpendicular to or slanting to the length direction of the second capsule part 12, two ends of each constraint rope are fastened to the flying place 20, and the second capsule part 12 is located below the constraint ropes. Preferably, each constraint rope is perpendicular to the length direction of the second capsule part 12.

Specifically, in this step, to protect the second capsule part 12 from damage due to abrasion of its constraint ropes, protection parts (not shown in the figure) are further disposed between the constraint ropes and the second capsule part 12. In this embodiment, the protection parts are protection cotton or anti-wear pads covering the constraint ropes. When the constraint ropes are fastened, preferably, the two ends of each constraint rope are fastened to the flying place 20 by using a ground anchor 71.

Figure 5:
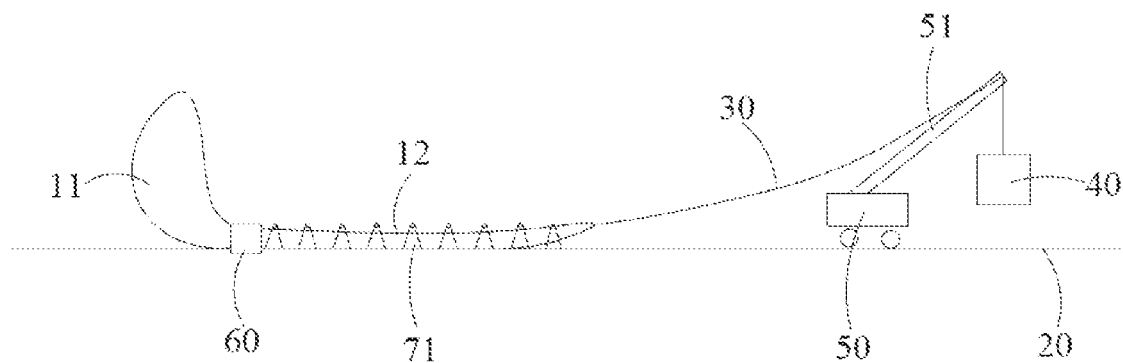
FIG. 5 is a side view when a first capsule part is inflated in step S3 of the embodiment of the present disclosure.
Figure 6:
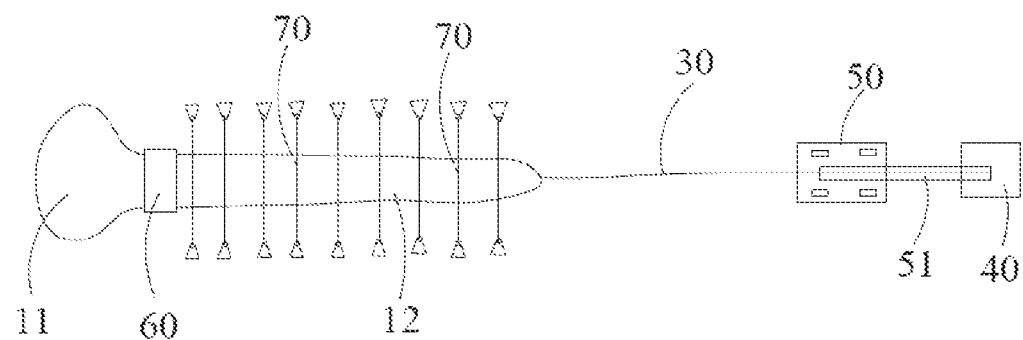
FIG. 6 is a top view of FIG. 5.

S3: Referring to FIG. 5 and FIG. 6, inflate the first capsule part 11 until the first capsule part 11 flies away from the ground.

In this embodiment, gas filled in the first capsule part 11 is lighter-than-air gas, and is usually helium. It can be learned from the figure that the first capsule part 11 continuously rises and stands upright in an inflation process, and at this time, the second capsule part 12 is still constrained by the plurality of constraint ropes 70.

Figure 7:
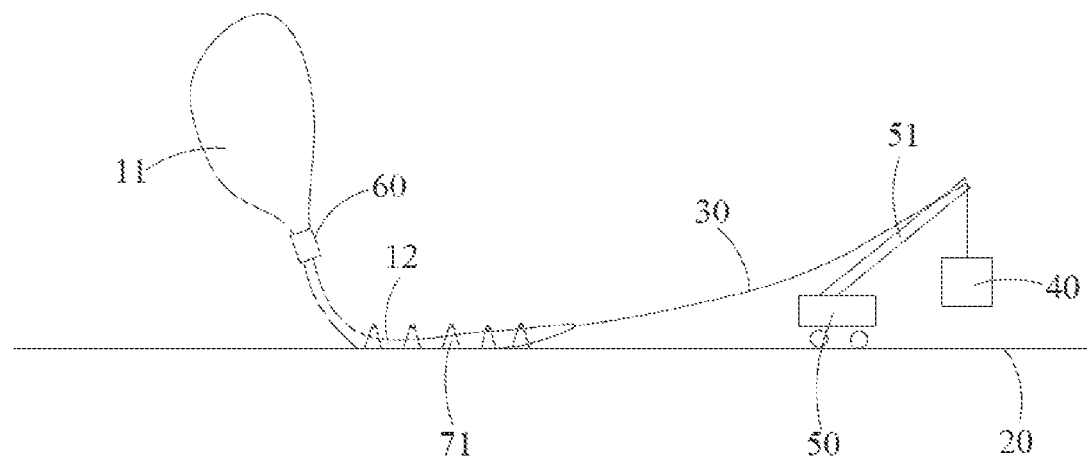
FIG. 7 is a side view when the constraint ropes are released sequentially in step S4 of the embodiment of the present disclosure.
Figure 8:
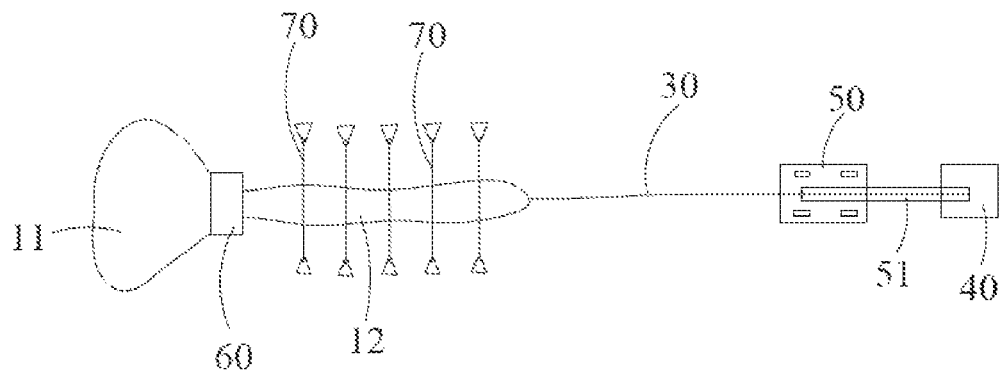
FIG. 8 is a top view of FIG. 7.

S4: Referring to FIG. 7 and FIG. 8, after the inflation ends, as the first capsule part 11 continuously moves towards a direction close to the launching vehicle 50 in a horizontal direction, start from one end, close to the first capsule part 11, of the second capsule part 12 to sequentially relieve constraints of constraint ropes on the second capsule part 12.

In this embodiment, after the gas is filled in the first capsule part 11, produced buoyancy is greater than a total weight of the balloon capsule 10, the rope 30, and the pod 40, so that the balloon capsule 10 can fly to the sky. In this step, starting from a constraint rope adjacent to the first capsule part 11, the constraint ropes are released sequentially towards the direction close to the launching vehicle 50. Depending on an actual onsite flying status of the balloon, the constraint ropes start to be released when the first capsule part 11 rises and moves above a first constraint rope. After a constraint rope is released, a next constraint rope is released when the first capsule part 11 rises and moves above the next constraint rope, until a last constraint rope is released. Specifically, the constraint ropes may be released by using an initiating explosive device or a rope cutter. Certainly, the constraint ropes may alternatively be released by using another release apparatus that has a same function.

Figure 9:
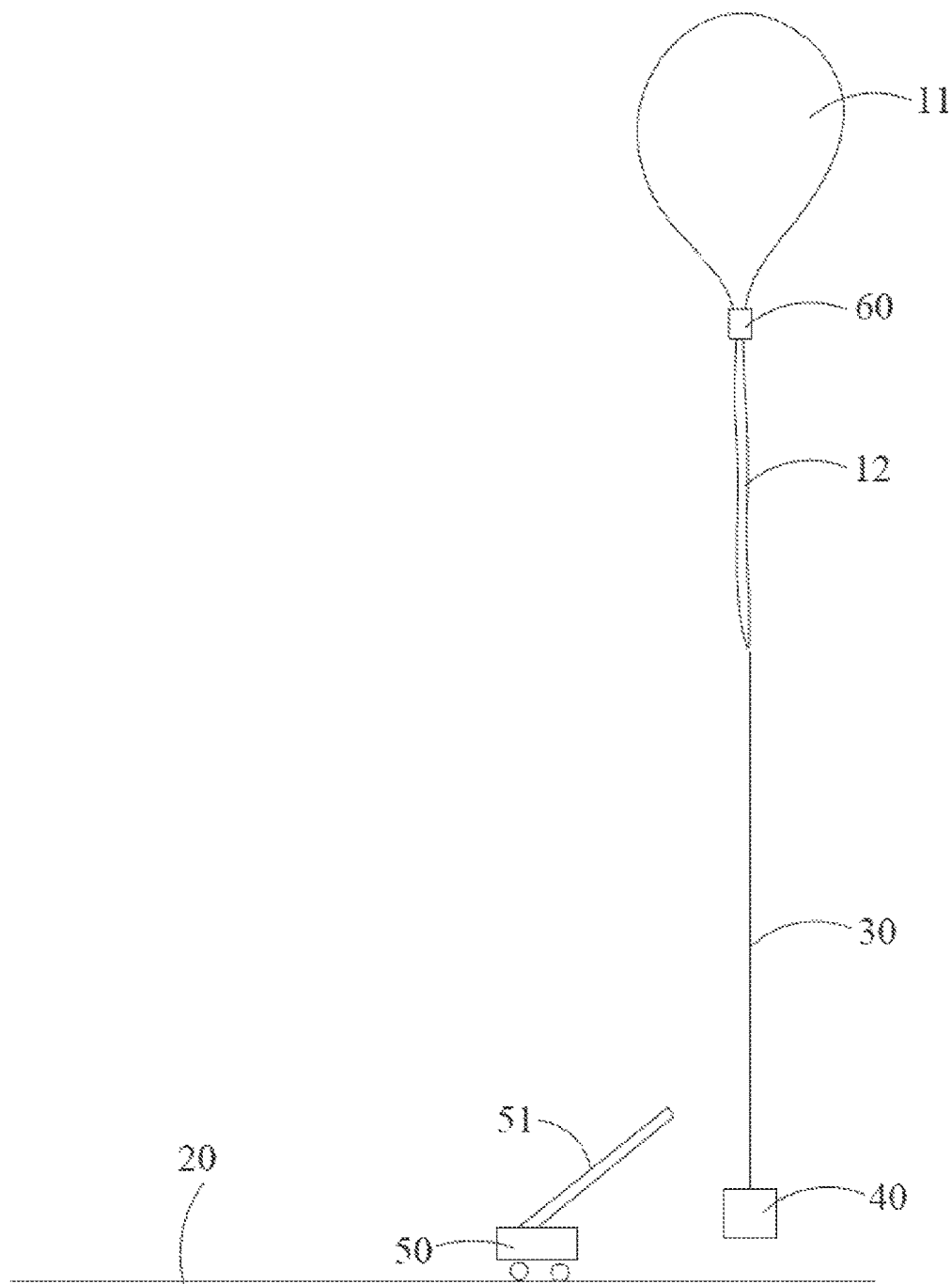
FIG. 9 is a side view when a constraint on a pod is relieved when the first capsule part rises above the pod in step S5 of the embodiment of the present disclosure.

Referring to FIG. 9, after all the constraint ropes are released, the launching vehicle 50 moves towards a direction close to the balloon capsule 10 as the first capsule part 11 rises, until the first capsule part 11 rises right above the pod 40, and then a constraint of the crane arm 51 on the pod 40 is relieved.

It should be noted that, in step S2, the constraint apparatus may alternatively be replaced with another structure. The constraint apparatus may alternatively be a rope. A disposal direction of the rope is perpendicular to a disposal direction of the plurality of constraint ropes in this embodiment, that is, the rope is disposed along the length direction of the second capsule part 12. A plurality of fastening points are disposed on the rope along a length direction of the rope. A constraint in the length direction of the second capsule part 12 is implemented by using the plurality of fastening points. In a rising process of the first capsule part 11, constraints of the fastening points on the second capsule part 12 are relieved progressively. This can also achieve an effect of a plurality of constraint ropes. Likewise, the constraint apparatus may alternatively be a rolling apparatus. First, the rolling apparatus is disposed at one end, close to the first capsule part 11, of the second capsule part 12. When the first capsule part 11 rises, and moves above the rolling apparatus in a horizontal direction, manpower or another power apparatus is used to drive the rolling apparatus to roll along the length direction of the second capsule part 12 towards a direction away from the first capsule part 11 for a distance, and then stop. After the first capsule part 11 continues rising, and moves above the rolling apparatus in the horizontal direction, the rolling apparatus moves again. This method is performed until the rolling apparatus fully moves outside the second capsule part 12. This achieves a same effect of slowly releasing the balloon capsule as that of a plurality of constraint ropes or one constraint rope.

Figure 10:
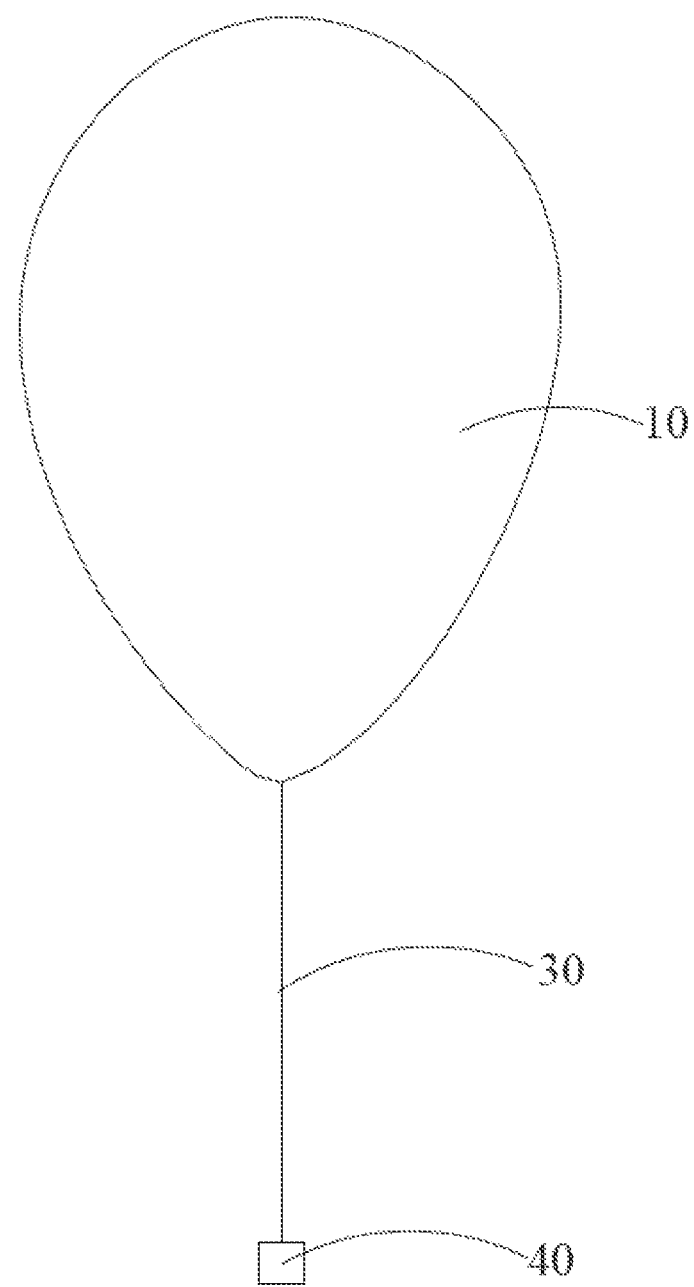
FIG. 10 is a side view when the balloon capsule is flown to the sky after a bundling part is released in step S6 of the embodiment of the present disclosure.

S5: When the balloon capsule 10 fully flies away from a crane arm 51, relieve a constraint of the bundling part 60 on the balloon capsule 10 through remote control. Lifting gas filled in the first capsule part 11 gradually inflates in a process of rising to a task height, until the entire balloon capsule 10 is filled with the lifting gas and the balloon capsule 10 is flown to the sky, as shown in FIG. 10.

In the method for flying a large balloon provided in the present disclosure, a plurality of constraint apparatuses that gradually relieve constraints are used to replace an independent roller. Because the constraint apparatuses are released sequentially in a release process of the balloon capsule 10, the balloon capsule 10 is released progressively and slowly before rising above the pod 40. This greatly reduces impact in a flying process, makes it easier to control a flying status of the balloon capsule 10, and also makes related operations of onsite staffs simpler and controllable.

The foregoing is merely a preferred embodiment of the present disclosure, but is not intended to limit the present disclosure. Any modification, equivalent replacement, or improvement made within the spirit and principle of the present disclosure shall fall within the protection scope of the present disclosure.

What is claimed is:

1. A method for flying a balloon, comprising the following steps:
    S1: connecting one end of a balloon capsule to one end of a rope, fastening the other end of the rope to a pod, and disposing, on the balloon capsule, a bundling part that can be controlled remotely, wherein the bundling part divides the balloon capsule into a first capsule part away from the pod and a second capsule part close to the pod;
    S2: disposing a constraint apparatus above the second capsule part, wherein the constraint apparatus constrains the second capsule part along a length direction of the second capsule part;
    S3: inflating the first capsule part until the first capsule part flies away from the ground;
    S4: when the first capsule part continuously moves towards a direction close to the pod in a horizontal direction, sequentially releasing the constraint apparatus in a direction from one end, close to the first capsule part, of the second capsule part to the pod;
    S5: after the balloon capsule fully rises, relieving a constraint of the bundling part on the balloon capsule, so that the entire balloon capsule is flown to the sky.

2. The method for flying a balloon as claimed in claim 1, wherein in step S1, the other end of the rope is fastened to the pod after passing by the top of a crane arm of a launching vehicle, the crane arm of the launching vehicle is disposed slantwise towards a direction away from the balloon capsule, the balloon capsule, the launching vehicle, and the pod are disposed in a straight line, and the launching vehicle is located between the balloon capsule and the pod.

3. The method for flying a balloon as claimed in claim 2, wherein after step S4, the launching vehicle moves as the first capsule part rises, and when the first capsule part rises right above the pod, a constraint of the crane arm on the pod is relieved.

4. The method for flying a balloon as claimed in claim 1, wherein the bundling part used in step S1 comprises a bundling strap configured to bundle the balloon capsule, and a breaking apparatus connected to the bundling strap and configured to break the bundling strap.

5. The method for flying a balloon as claimed in claim 4, wherein the breaking apparatus used in step S1 comprises a wireless communications element and a breaking element, the wireless communications element is configured to receive a remote control instruction so that the breaking element can be controlled remotely, and the breaking element is configured to: under an indication of the remote control instruction received by the wireless communications element, break the bundling strap by means of cutting or burning.

6. The method for flying a balloon as claimed in claim 5, wherein the breaking element is an initiating explosive device or a rope cutter.

7. The method for flying a balloon as claimed in claim 1, wherein the constraint apparatus used in step S2 comprises a plurality of constraint parts that are disposed sequentially along the length direction of the second capsule part at a spacing, and the plurality of constraint parts are configured to respectively constrain the second capsule part at places in the length direction of the second capsule part.

8. The method for flying a balloon as claimed in claim 7, wherein the constraint parts are constraint ropes, an extension direction of each constraint rope is perpendicular to or slanting to the length direction of the second capsule part, two ends of each constraint rope are fastened to a flying place, and the second capsule part is located below the constraint ropes.

9. The method for flying a balloon as claimed in claim 8, wherein in step S2, protection parts are disposed between the constraint ropes and the second capsule part to protect the second capsule part.

10. The method for flying a balloon as claimed in claim 9, wherein the protection parts are protection cotton or anti-wear pads covering the constraint ropes.

11. The method for flying a balloon as claimed in claim 10, wherein in step S2, the two ends of each constraint rope are fastened to the flying place by using a ground anchor.

12. The method for flying a balloon as claimed in claim 10, wherein in step S4, after a constraint rope is released, a next constraint rope is released when the first capsule.

13. The method for flying a balloon as claimed in claim 9, wherein in step S2, the two ends of each constraint rope are fastened to the flying place by using a ground anchor.

14. The method for flying a balloon as claimed in claim 9, wherein in step S4, after a constraint rope is released, a next constraint rope is released when the first capsule.

15. The method for flying a balloon as claimed in claim 8, wherein in step S2, the two ends of each constraint rope are fastened to the flying place by using a ground anchor.

16. The method for flying a balloon as claimed in claim 8, wherein in step S4, after a constraint rope is released, a next constraint rope is released when the first capsule part rises and moves above the next constraint rope, until a last constraint rope is released.

\* \* \* \* \*